UNITED STATES PATENT OFFICE.

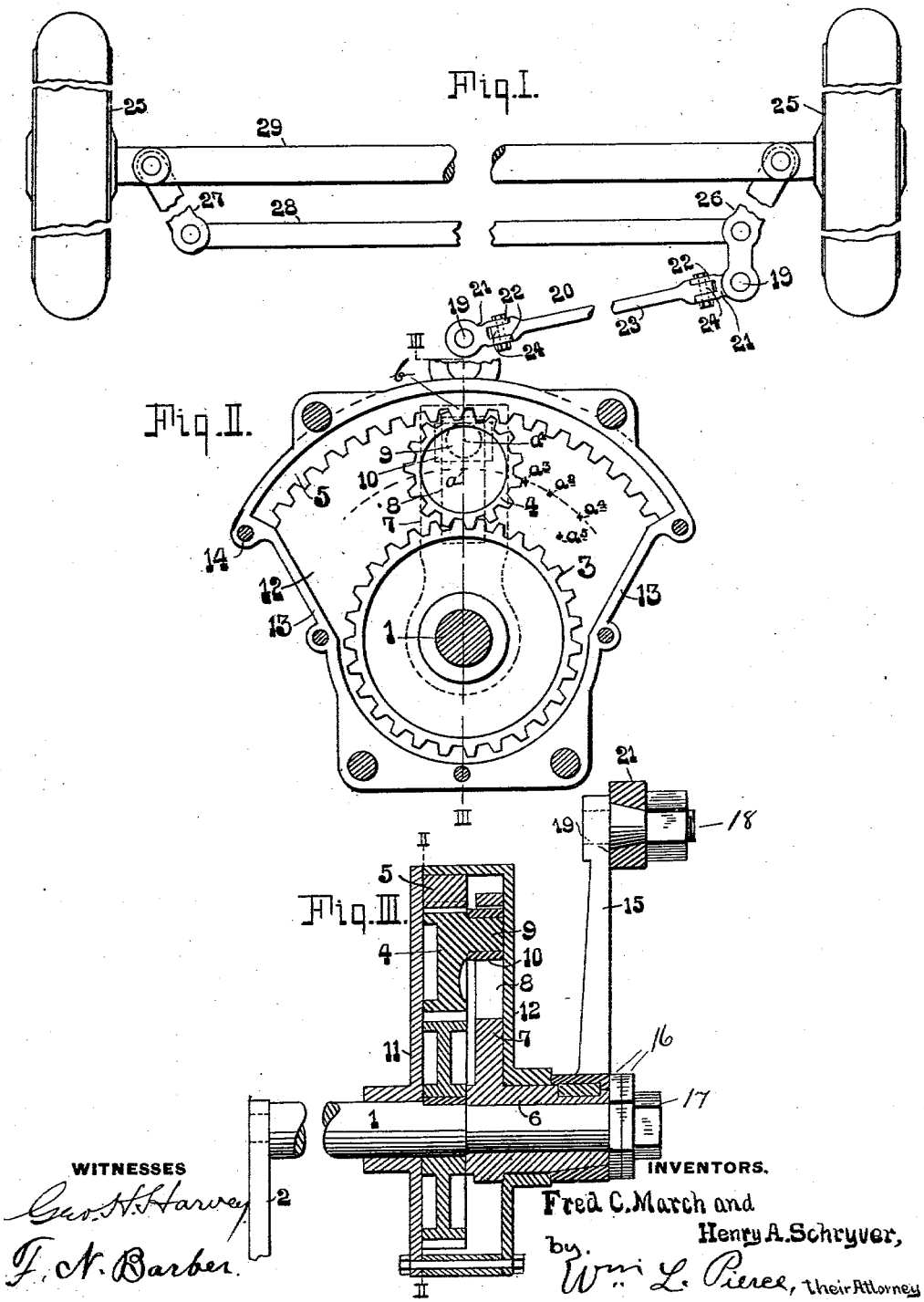

HENRY A. SCHRYVER AND FRED C. MARCH, OF WARREN, OHIO.

STEERING-GEAR FOR MOTOR-CARRIAGES.

SPECIFICATION forming part of Letters Patent No. 715,302, dated December 9, 1902.

Application filed March 8, 1902. Serial No. 97,292. (No model.)

*To all whom it may concern:*

Be it known that we, HENRY A. SCHRYVER and FRED C. MARCH, citizens of the United States, residing at Warren, in the county of Trumbull and State of Ohio, have invented or discovered new and useful Improvements in Steering-Gears for Motor-Carriages, of which the following is a specification.

Figure I is a plan view of the steering arrangements of a motor-carriage to which our steering-gear is applied. Fig. II is a section taken on the line II II of Fig. III. Fig. III is a section taken on the line III III of Fig. II.

Our invention relates to steering mechanism of the practically irreversible or locked type adapted to automobiles or other vehicles or to vessels.

We do not confine our invention to the steering of automobiles, as the same is applicable to the rudder of a boat or to vehicles generally.

The objects of our invention are to simplify and cheapen steering mechanisms and to render them more compact and light.

In the steering mechanism of an automobile it is desirable that the operating wheel or handle turn through a larger arc to produce a given angular motion of the steering-wheels when the vehicle is pursuing a course straight forward or varying but slightly from such a course than when the angularity of the steering-wheels is near maximum, as in turning sharp corners. High speeds are attempted only on straight or approximately straight courses. In order that the operator may have more perfect control of his vehicle, he needs greater leverage on his steering-wheels at high than at low speeds. We supply this need in a practical manner, enabling the operator to guide his vehicle with great accuracy, steadiness, and safety at high speeds without increasing the amount of turning of the operating wheel or handle necessary to produce the maximum angular motion of the steering-wheels.

In our steering mechanism we have provided for an acceleration of the angular movement of the steering-wheels as the operating wheel or handle is moved farther and farther from its central or normal position. Thus a larger motion is given to the steering-wheels as the operating wheel or handle reaches its limits than when the wheel or handle starts from its normal position or is moving only a short distance therefrom. This lessens liability of accident when running very fast on straight courses, since a larger relative movement of the operating wheel or handle is necessary to make a change in the course. If a slight movement of the handle would make a great change from the straight-ahead course, there would be danger at high speeds of the vehicle becoming unmanageable and running into other vehicles or obstacles before the angularity of the steering-wheels could be changed to avoid the danger. Sharp corners are not turned at high speeds. Hence a slight change in the angular movement of the operating-handle can safely make a large change of angularity in the steering-wheels. This also serves to economize space.

In the drawings, 1 represents the steering-shaft to which the steering-handle 2 is secured. Fixed on this shaft is the spur-gear 3, which meshes with the pinion 4, whose number of teeth is fewer than that of gear 3. Pinion 4 meshes with and has travel along fixed arc-shaped rack 5, situated beyond and concentric with the gear 3.

Having bearing against the hub of gear 3 is a sleeve 6, loose on the shaft 1. The sleeve has, preferably, integral therewith the radial arm 7, provided with a radial slot 8 opposite the space between gear 3 and rack 5. The pinion 4 is provided with a pin 9, which extends into slot 8 and is journaled in a slide 10, having travel radially in a slot 8. This pin is preferably eccentric to the pinion, and when the latter is at the center $b$ of the rack the pin should preferably be on that side of the center of the pinion which is farthest from the shaft 1, the center of the shaft, the pinion, and the pin being in a straight line.

The gear 3, pinion 4, rack 5, arm 7, pin 9, and slide 10 are inclosed in a dust-proof oil-tight casing composed of top plate or cover 11 and bottom plate 12, provided with flange 13, on the top of which flange the plate 11 is secured by means of bolts 14. The shaft 1 has bearing in a flanged opening in the plate 11, and the hub of the sleeve 6 has bearing in a flanged opening in the plate 12. Keyed to the sleeve 6 outside of the casing is a radial arm 15, held on the sleeve by means of nuts 16. A nut 17 is screwed on the shaft 1 and against the nuts 16. The outer end of the arm 15 has secured therein a downwardly-extending pin 18, which is seated in the eye 19 in a section of the link 20. This link is composed of three sections, the extremes of which consist of castings 21, provided with eyes 19 and forks 22. The middle section 23 is provided with tongues 24, pivoted in the forks 22, so as to permit vertical movement of the castings 21. The steering-wheels 25 are mounted upon knuckles or steering-spindles 26 and 27, connected by the link 28 and journaled at the ends of a cross-bar or axle 29. The casting 21 farthest from the steering-arm 15 is pivotally secured to the end of the knuckle 26, the link 28 being connected to such knuckle between the casting 21 and the axis of the knuckle.

It will be seen that any movement of the operating-handle 2 will impart angular movement to the steering-wheels 25. The movement of the latter will not be uniform with the movement of the former, but will be retarded and accelerated as the handle moves from the normal or central position in the manner now to be explained.

Suppose the shaft 1 to be turned to the right in Fig. II. The gear 3 will roll the pinion along the rack 5 toward the right. The center $a'$ of the pin 9 will at starting move slower to the right than the center $a$ of the pinion 4, as a large part of the movement of center $a'$ will be radially in the slot 8. The center $a'$ will lose in right-hand movement on the center $a$ until the center $a'$ is on the path of travel of the center $a$. The centers $a$ and $a'$ will then have the positions $a^2$ and $a^3$, respectively. Further movement of the pinion to the right brings the center $a$ so as to travel in the same direction at the lower half of the pinion. Hence the center $a'$ will gain on the center $a$. The positions $a^4$ and $a^5$ represent the positions of the centers $a$ and $a'$, respectively, when center $a'$ is between center $a$ and the center of the shaft 1. Here the center $a'$ has overtaken center $a$. Further movement of the pinion will place the center $a'$ in advance of center $a$. As the right-hand motion of center $a'$ is transmitted to the steering-wheels 25 it will be seen that there is an acceleration of the steering-wheels in relation to the motion of the operating wheel or handle 2 after the latter has moved the steering-wheels slightly from their straight-ahead course. With the parts in the position shown in Fig. II any reversal or twisting of the steering-wheels by obstructions will be practically impossible. The force tending to reversal will be transmitted through the steering knuckles, link 20, and arm 15 to the arm 7. The force applied to arm 7 will be received by the pin 9. The point $b$ becomes the fulcrum of the pinion considered as a lever, the long arm being the diameter of the pinion and the short arm being the distance of center $a'$ from point $b$. The free end of this lever is locked by the gear 3, the latter in turn being held by the steering-handle 2, which is long relatively to the radius of gear 3. The steering mechanism is therefore practically irreversible by any force applied to the steering-wheels.

Throughout the specification reference has been made to angular changes of the steering-wheels, by which is meant the change of the angle made by the wheels relative to the axle or cross-bar 29.

In the claims the shaft 1 is described as moving to or from a definite point. This point is definite, since it is determined by the position of the centers $a$ and $a'$, as above described.

The drawings illustrate only one form which our invention may assume, and as our invention may be modified in some of its parts we do not desire to be restricted to the precise form shown, except where specifically claimed.

Having described our invention, we claim—

1. In a steering mechanism, a steering-shaft, steering-wheels, and intermediate mechanism connected to said shaft and wheels, the rotation of said shaft from its normal position to a definite point producing retarded angular movement of the steering-wheels.

2. In a steering mechanism, a steering-shaft, steering-wheels, and intermediate mechanism connected to said shaft and wheels, the rotation of said shaft from its normal position to a definite point producing retarded angular movement of the steering-wheels and the rotation of said shaft beyond said point producing accelerated angular movement of said wheels.

3. In a steering mechanism, a steering-shaft, steering-wheels, a gear-wheel on the shaft, an externally-toothed rotatable pinion meshing with the gear-wheel, and connections from the pinion to the steering-wheels, the rotation of said shaft from a definite point producing accelerated angular movement of the steering-wheels.

4. In a steering mechanism, a steering-shaft, steering-wheels, a gear-wheel secured to the shaft, an externally-toothed rotatable pinion meshing with the gear-wheel, a rack meshing with said pinion and connections from the pinion to the steering-wheels, the rotation of said shaft from a definite point producing accelerated angular movement of the steering-wheels.

5. In a steering mechanism, a steering-shaft, steering-wheels, a gear-wheel secured to the shaft, an externally-toothed rotatable pinion meshing with the gear-wheel, a pin carried by the pinion and an arm connected to the steering-wheels and the pin.

6. In a steering mechanism, a steering-shaft, steering-wheels, a gear-wheel connected to the shaft, a pinion meshing with the gear-wheel and provided with an eccentric-pin, and an arm connected to the steering-wheels and the pin.

7. In a steering mechanism, a steering-shaft, steering-wheels, a gear-wheel connected to the shaft, a pinion meshing with the gear-wheel and provided with an eccentric-pin, a fixed rack meshing with the pinion, and an arm associated with the pin and connected to the steering-wheels.

8. In a steering mechanism, a steering-shaft, steering-wheels, a gear-wheel connected to the shaft, a pinion meshing with the gear-wheel and provided with a pin, a fixed rack meshing with the pinion, and an arm associated with the pin and connected to the steering-wheels.

9. In a steering mechanism, a steering-shaft, steering-wheels, intermediate mechanism connected to said shaft and wheels, the rotation of said shaft from its normal position to a definite point producing retarded angular movement of the steering-wheels, and a dust-proof, oil-tight casing for said intermediate mechanism.

10. In a steering mechanism, a steering-shaft, steering-wheels, intermediate mechanism connected to said shaft and wheels, the rotation of said shaft from its normal position to a definite point producing retarded angular movement of the steering-wheels and the rotation of said shaft beyond said point producing accelerated angular movement of said wheels, and a dust-proof, oil-tight casing for said intermediate mechanism.

11. In a steering mechanism, a steering-shaft, steering-wheels, a gear-wheel on the shaft, a pinion meshing with the gear-wheel, connections from the pinion to the steering-wheels, the rotation of said shaft from a definite point producing accelerated angular movement of the steering-wheels, and a dust-proof, oil-tight casing for said gear-wheel, pinion, and connections.

12. In a steering mechanism, a steering-shaft, steering-wheels, a concave track, a gear-wheel coöperating with the track, a second gear-wheel coöperating with the first gear-wheel, one of the said gear-wheels being connected with the said shaft and the other with the steering-wheels.

Signed at Warren, Ohio, this 26th day of February, 1902.

HENRY A. SCHRYVER.
FRED C. MARCH.

Witnesses:
J. W. MARCH,
F. G. BROWN.